United States Patent
Hosomi et al.

(10) Patent No.: US 7,252,306 B2
(45) Date of Patent: Aug. 7, 2007

(54) STEERING ASSEMBLY

(75) Inventors: Norio Hosomi, Kashiwara (JP);
Kenichi Aota, Nara (JP); Satoshi Kinoshita, Aichi (JP)

(73) Assignees: JTEKT Corporation, Osaka (JP);
Fujikiko Co., Ltd., Shizuoka (JP)

( * ) Notice: Subject to any disclaimer, the term of this patent is extended or adjusted under 35 U.S.C. 154(b) by 333 days.

(21) Appl. No.: 10/833,299

(22) Filed: Apr. 28, 2004

(65) Prior Publication Data
US 2005/0001417 A1 Jan. 6, 2005

(30) Foreign Application Priority Data
Apr. 28, 2003 (JP) ............................. 2003-124367

(51) Int. Cl.
*B62D 1/16* (2006.01)

(52) U.S. Cl. .................................................. 280/779

(58) Field of Classification Search ................ 280/771, 280/777, 779; 74/492
See application file for complete search history.

(56) References Cited

U.S. PATENT DOCUMENTS

| | | | | |
|---|---|---|---|---|
| 3,492,888 A | * | 2/1970 | Nishimura et al. | ........... 74/492 |
| 3,703,105 A | * | 11/1972 | Milton et al. | .................. 74/492 |
| 3,815,438 A | * | 6/1974 | Johnson | ........................ 74/492 |
| 5,193,848 A | * | 3/1993 | Faulstroh | ..................... 280/775 |
| 5,722,300 A | * | 3/1998 | Burkhard et al. | ............. 74/493 |

FOREIGN PATENT DOCUMENTS

| | | | |
|---|---|---|---|
| DE | 1966981 A1 | * | 1/1976 |
| JP | 2000-85589 | | 3/2000 |
| JP | 2000-85596 | | 3/2000 |
| JP | 2002-173035 | | 6/2002 |
| JP | 2002-255044 | | 9/2002 |

* cited by examiner

*Primary Examiner*—Faye M. Fleming
(74) *Attorney, Agent, or Firm*—Rabin & Berdo, PC

(57) ABSTRACT

A steering assembly includes a steering column including a column housing for retaining a column tube, and a reinforcing member for reinforcing an end of the column tube. The column housing includes a positioning portion, and a fitting hole having an aperture at the positioning portion. The column tube includes an end fitted in the fitting hole. The reinforcing member includes a sleeve having a first and a second end, and a flange extended radially outwardly from the first end of the sleeve. The sleeve is fixed as fitted on an outer periphery of an end of the column tube and inserted in the fitting hole at the second end thereof. The flange is abutted on the positioning portion of the column housing, for axially and/or radially positioning the column tube.

13 Claims, 1 Drawing Sheet

STEERING ASSEMBLY

BACKGROUND OF THE INVENTION

1. Field of the Invention

The present invention relates to a steering assembly for a vehicle.

2. Description of Related Arts

An example of automotive steering assemblies includes a steering column including a column housing having a fitting hole, and a column tube fitted in the fitting hole at one end thereof. This type of steering assembly has an arrangement wherein a steering shaft is rotatably supported in the steering column.

In some cases, for instance, the column tube has an inner tube and an outer tube slidably fitted on an outer periphery of the inner tube, whereas the inner tube of the column tube is fitted in the fitting hole. When an impact load is applied from a driver to the column tube during automotive collision (or in the event of a so-called secondary collision), the outer tube may be slidably moved relative to the inner tube thereby absorbing the impact load.

As the steering assembly of this type, there has been proposed a steering assembly wherein a bracket for securing the column housing to a vehicle body is formed in a fashion to bridge between the column housing and the column tube (see, for example, Document 1: Japanese Unexamined Patent Publication No.2000-85589 published on Mar. 28, 2000).

There has been proposed another steering assembly wherein a ring-like clamping member, which is called a clamp, is mounted on an outer periphery of a fit-engagement portion between the column housing and the column tube thereby fastening the column housing and the column tube with each other (see, for example, Document 2: Japanese Unexamined Patent Publication No.2000-85596 published on Mar. 28, 2000).

There has been proposed still another steering assembly wherein the column tube has the bracket welded to its end at which the column tube is secured to the column housing, whereas the bracket is fixed to the column housing by means of a bolt (see, for example, Document 3: Japanese Unexamined Patent Publication No.2002-173035 published on Jun. 18, 2002).

There has been proposed still another steering assembly wherein the column tube is provided with a flange at its end press-fitted in the fitting hole, the flange extended radially inwardly (see, for example, Document 4: Japanese Unexamined Patent Publication No.2002-255044 published on Sep. 11, 2002).

By the way, it is preferred that the column tube (the inner tube, for example) has a high mounting rigidity to the column housing such that the inner and outer tubes may be slidably moved in a favorable manner during the secondary collision.

However, all the assemblies of the above Documents 1, 2 and 3 encounter limitations on space for assembly layout because the column tube is disposed in a cabin where the layout space is limited.

According to the steering assembly of the above Document 4, on the other hand, the column tube is provided with the flange extended radially inwardly so as to attain a sufficient thickness at its portion fitted in the column housing and also to ensure the high mounting rigidity. Unfortunately, however, no measure of the press-fit quantity is available when the column tube is press-fitted in the fitting hole of the column housing. Therefore, the press-fitting operation takes much labor, resulting in a labor intensive assembly work.

SUMMARY OF THE INVENTION

An object of the invention is to provide a steering assembly which ensures a sufficient mounting rigidity of the column tube to the column housing and which reduces labor taken in the assembly work.

In accordance with a preferred embodiment of the invention, the steering assembly comprises: a steering column including a column tube for rotatably supporting a steering shaft, and a column housing for retaining the column tube; and a reinforcing member for reinforcing an end of the column tube. The column housing includes a positioning portion, and a fitting hole having an aperture at the positioning portion, whereas the column tube includes an end to be fitted in the fitting hole. The reinforcing member includes a sleeve having a first and a second end, and a flange extended radially outwardly from the second end of the sleeve. The sleeve is fixed to be fitted on an outer periphery of the end of the column tube, and has the first end thereof fitted in the fitting hole of the column housing. The flange of the reinforcing member is abutted on the positioning portion of the column housing, thereby axially and/or radially positioning the column tube.

According to the invention, the end of the column tube is reinforced by fitting the sleeve of the reinforcing member together with the end of the column tube in the fitting hole of the column housing and by making the flange of the reinforcing member abut on the column housing. This ensures the sufficient mounting rigidity of the column tube to the column housing, without increasing the thickness of the column tube.

Furthermore, the column tube can be axially and/or radially positioned with respect to the column housing in quite an easy way in which the flange of the reinforcing member is simply abutted on the positioning portion of the column housing. This results in a dramatic reduction of the labor taken in the assembly work.

DETAILED DESCRIPTION OF THE PREFERRED EMBODIMENT

Figure 1:
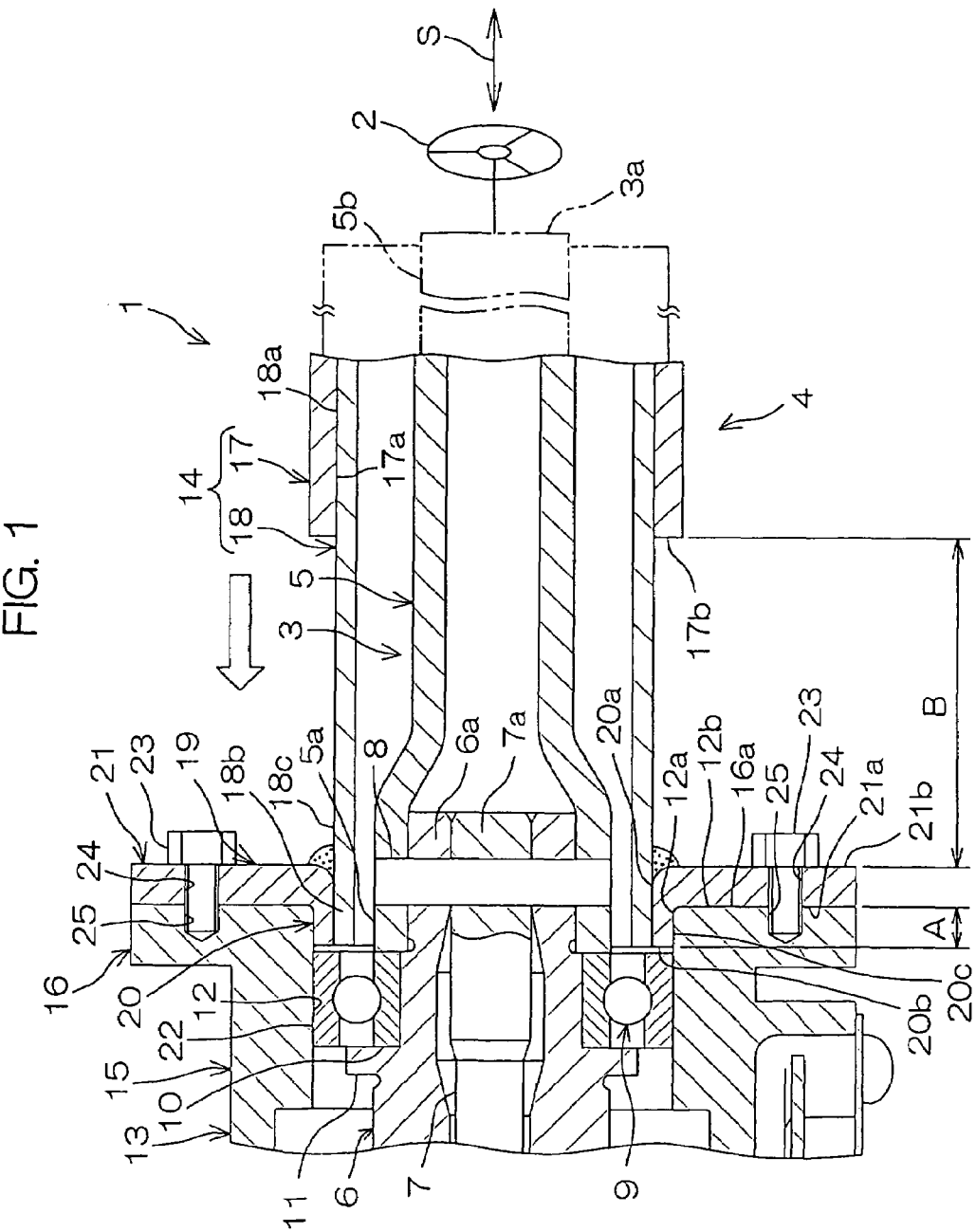
FIG. 1 is a partly sectioned side view showing a steering assembly according to one embodiment of the invention.

A preferred embodiment of the invention will be described with reference to the attached drawing.

FIG. 1 is a partly sectioned side view showing a steering assembly 1 according to one embodiment of the invention. Referring to FIG. 1, the steering assembly 1 includes a steering shaft 3 integrally rotatably connected with a steering member 2 such as a steering wheel, and a steering column 4 rotatably supporting the steering shaft 3 allowing the steering shaft 3 to penetrate therethrough.

The steering shaft 3 includes a first end 3a to which the steering member 2 is mounted, and an unillustrated second end connected with an unillustrated intermediate shaft. A rotational force associated with a rotational operation of the steering member 2 is transmitted to a steering mechanism (not shown) including a pinion, a rack shaft and the like via the steering shaft 3 and the intermediate shaft whereby steerable road wheels of a vehicle are steered.

The steering shaft 3 is divided into a first steering shaft 5 continuing into the steering member 2, and a tubular second steering shaft 6 as an output shaft continuing into the intermediate shaft. These first and second steering shafts 5, 6 are connected with each other on the same axis through a torsion bar 7 in a manner to be free to rotate relative to each other.

A first end 6a of the second steering shaft 6, a first end 5a of the first steering shaft 5, and a first end 7a of the torsion bar 7 are connected with one another via a pin 8 as allowed to rotate integrally.

The first steering shaft 5 includes a pair of tubes serration-connected with each other (only a part thereof is shown in FIG. 11). The first steering shaft 5 is adapted to contract between the first end 5a and a second end 5b thereof along an axial direction S. This permits the steering member 2 and the second end 5b of the first steering shaft 5 to be moved toward the first end 5a thereof (in a direction of a hollow arrow) when an impact load is applied to the steering member 2 due to the secondary collision or the like.

An inner ring 10 of a bearing 9, for example comprised of a roller bearing, is fitted on the second steering shaft 6 at an axial intermediate portion thereof close to the first end 6a thereof. The inner ring 10 is sandwiched between an annular intermediate flange 11 of the second steering shaft 6 and the first end 5a of the first steering shaft 5, so as to be restricted in the axial movement thereof.

The steering column 4 includes a column housing 13 having a fitting hole 12, and a tubular column tube 14 partially fitted in the fitting hole 12. The column housing 13 has a cylindrical main body 15, whereas the aforesaid fitting hole 12 has an aperture 12a at an end of the main body 15. The column housing 13 has an annular flange 16 extended radially outwardly from an edge 12b of the aperture 12a. The edge 12b of the aperture 12a and an end face 16a of the annular flange 16 constitute a positioning portion. The edge 12b of the aperture 12a and the end face 16a of the annular flange 16 are flush with each other and are orthogonal to the axial direction S of the steering shaft 3 or the axial direction of the column tube 14.

The column tube 14 includes an upper tube 17 as an outer tube, and a lower tube 18 as an inner tube. The column tube coaxially surrounds the most part of the first steering shaft 5. The upper tube 17 and the lower tube 18 are axially slidable relative to each other.

The upper tube 17 is located at place axially closer to the second end 5b of the first steering shaft 5. A first end 18a of the lower tube 18 is coaxially fitted in an inside circumference of a first end 17a of the upper tube 17. The upper tube 17 is adapted to be moved as operatively connected with the second end 5b of the first steering shaft 5. Therefore, in a case where the upper tube 17 is subjected to the impact load from the steering member 2 due to the secondary collision, the upper tube 17 in operative connection with the second end 5b of the first steering shaft 5 moves toward the first end 5a of the steering shaft (in the direction of the hollow arrow) as producing sliding resistance, thereby to absorb the impact load.

The lower tube 18 is located axially closer to the first end 5a of the first steering shaft 5. A second end 18b of the lower tube 18, as an insertable end thereof, is coaxially located in the fitting hole 12 of the column housing 13. The second end 18b of the lower tube 18, or in other words, the inserted end thereof in the fitting hole 12 of the column housing 13 is reinforced with a reinforcing member 19.

The reinforcing member 19 includes a sleeve 20 having a first and a second end 20a, 20b, and an annular flange 21 extended from the first end 20a of the sleeve 20. The sleeve 20 is press-fitted on an outer periphery 18c of the second end 18b of the lower tube 18 and fixed thereto by, for example, welding. Furthermore, the sleeve 20 is inserted in the fitting hole 12 of the column housing 13 at the second end (20b) thereof. The annular flange 21 forms a disk-like shape extended radially outwardly from the first end 20a of the sleeve 20.

The sleeve 20 has a predetermined thickness (substantially the same thickness as that of the lower tube 18, for instance) and is secured to the second end 18b of the lower tube 18 in an overlapping relation. Hence, the sleeve reinforces the second end 18b, thus contributing to the enhancement of the rigidity of the second end 18b.

The annular flange 21 has a predetermined thickness (200% of the thickness of the lower tube 18, for instance) and is formed integrally with the sleeve 20.

An outer ring 22 of the bearing 9 is fitted in the fitting hole 12 of the column housing 13. The lower tube 18 is axially and/or radially positioned with respect to the column housing 13 by fastening the annular flanges 16, 21 to each other by means of a bolt 23 in a state where the annular flange 16 of the column housing 13 and the annular flange 21 of the reinforcing member 19 are abutting on each other.

Specifically, the plural bolts 23 are inserted through bolt through-holes 24 of the annular flange 21 of the reinforcing member 19 and screwed into screw holes 25 of the annular flange 16 of the column housing 13, the bolt though-holes 24 corresponding to the screw holes 25, whereby the reinforcing member 19 and the lower tube 18 fixed to the reinforcing member 19 are fixed to the column housing 13.

An axial length of an outer periphery 20c of the sleeve 20, or in other words, a projection quantity A of the sleeve 20 from an end face 21a of the annular flange 21 is substantially equal to a fitting length of the lower tube 18 with respect to the column housing 13. The aforesaid fitting length may be readily set by setting the aforesaid projection quantity A.

With respect to the axial direction, a distance B between the other end face 21b of the annular flange 21 and an opposite end face 17b of the upper tube 17 is substantially equal to a slidably movable distance of the upper tube 17 during collision, or in other words, an impact absorbing stroke thereof. Since the sleeve 20 is fitted in the column housing 13, a sufficient impact absorbing stroke is ensured.

In this manner, the embodiment accomplishes the reinforcement of the second end 18b of the lower tube 18 by fitting the sleeve 20 of the reinforcing member 19 together with the second end 18b of the lower tube 18 in the fitting hole 12 of the column housing 13 and by making the annular flange 21 of the reinforcing member 19 abut on the annular flange 16 of the column housing 13. Thus is ensured the sufficient mounting rigidity of the column tube 14 to the column housing 13, without increasing the thickness of the column tube 14.

During the secondary collision, therefore, the upper tube 17 may favorably slide on the lower tube 18 without suffering from the influence of bending load while the tube may be contracted in a sufficient amount. Thus, the upper tube can absorb the impact load in a favorable manner.

Furthermore, the column tube 14 can be axially and/or radially positioned with respect to the column housing 13 in quite an easy way in which the annular flange 21 of the reinforcing member 19 is simply abutted on the edge 12b of the aperture 12a and the end face 16a of the annular flange 16 which constitute the positioning portion of the column housing 13. Thus, the labor taken in the assembly work can be dramatically reduced.

The invention is not limited by the contents of the foregoing embodiment. For example, the sleeve 20 and the annular flange 21 of the reinforcing member 19 may be formed as separate pieces. Alternatively, the annular flange 21 and the annular flange 16 may be replaced by arcuate flanges.

While the invention has been described in details by way of reference to the specific embodiment thereof, variations and modifications thereof as well as equivalent thereto will be apparent to those skilled in the art who fully understand the foregoing description. The scope of the invention, therefore, is defined by the following claims and equivalents thereto.

The present application corresponds to a patent application No.2003-124367 filed with Japanese Patent Office on Apr. 28, 2003, and the whole disclosure thereof is incorporated herein by reference.

The invention claimed is:

1. A steering assembly comprising:
   a steering shaft; and
   a steering column for retaining the steering shaft, the steering column including a column tube for rotatably supporting the steering shaft, and a column housing for retaining the column tube,
   the column housing including a positioning portion, and a fitting hole having an aperture at the positioning portion,
   the column tube including an insertable end inserted in the fitting hole,
   the steering assembly further comprising a reinforcing member to reinforce the insertable end of the column tube, the reinforcing member including a sleeve having a first end and a second end, and a flange extended radially outwardly from the first end of the sleeve,
   the sleeve being fitted on an outer periphery of the insertable end of the column tube, and inserted in the fitting hole of the column housing at the second end thereof,
   the flange of the reinforcing member abutted on the positioning portion of the column housing thereby axially and/or radially positioning the column tube;
   wherein the reinforcing member is made of metal;
   wherein the sleeve of the reinforcing member is press-fitted onto an outer circumference of the insertable end of the column tube, wherein relative movement between the sleeve of the reinforcing member and the column tube is restricted in an axial direction;
   wherein the flange of the reinforcing member and the positioning portion of the column housing are coupled to each other in a state where the flange of the reinforcing member abuts the positioning portion; and
   wherein the column tube is fixed to the column housing by the reinforcing member.

2. The steering assembly according to claim 1, wherein the flange of the reinforcing member includes an annular flange.

3. The steering assembly according to claim 1, wherein the positioning portion includes an edge of the aperture of the fitting hole.

4. The steering assembly according to claim 1, wherein the positioning portion includes a plane orthogonal to an axial direction of the column tube.

5. The steering assembly according to claim 1, wherein the flange of the reinforcing member has a greater thickness than that of the column tube.

6. The steering assembly according to Clam 1, wherein the column housing includes a flange extended from an edge of the aperture of the fitting hole, whereas the positioning portion includes an end face of the flange of the column housing.

7. The steering assembly according to claim 6, wherein the flange of the reinforcing member and a flange of the column housing are brought into abutting contact relation and fastened to each other.

8. The steering assembly according to claim 1, wherein an axial length of an outer periphery of the sleeve is equivalent to a fitting length of the column tube with respect to the column housing.

9. The steering assembly according to claim 1, wherein the column tube includes an upper tube and a lower tube fitted with each other, and the reinforcing member is to reinforce an end of the lower tube.

10. The steering assembly according to claim 9, wherein an impact load can be absorbed by relative sliding movements between the upper and lower tubes, and wherein a distance between the flange of the reinforcing member and an opposite end face of the upper tube is substantially equal to a quantity of stroke of the upper tube absorbing the impact load.

11. The steering assembly according to claim 1, wherein the sleeve of the reinforcing member is welded onto an outer circumference of the column tube.

12. The steering assembly according to claim 1, wherein the flange of the reinforcing member is bolted to the positioning portion of the column housing.

13. The steering assembly according to claim 12, wherein the flange of the reinforcing member includes bolt through-holes.

* * * * *